Jan. 31, 1939.  E. D. O'DONNELL  2,145,571
COMBINED MEANS FOR JACKING MOTOR VEHICLES
Filed Feb. 28, 1936
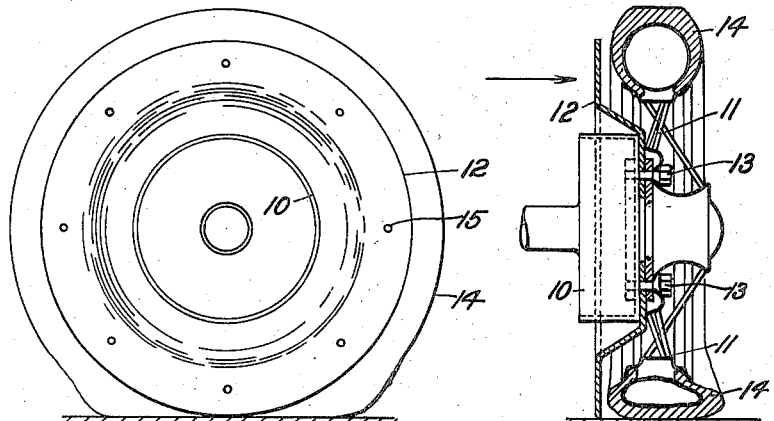
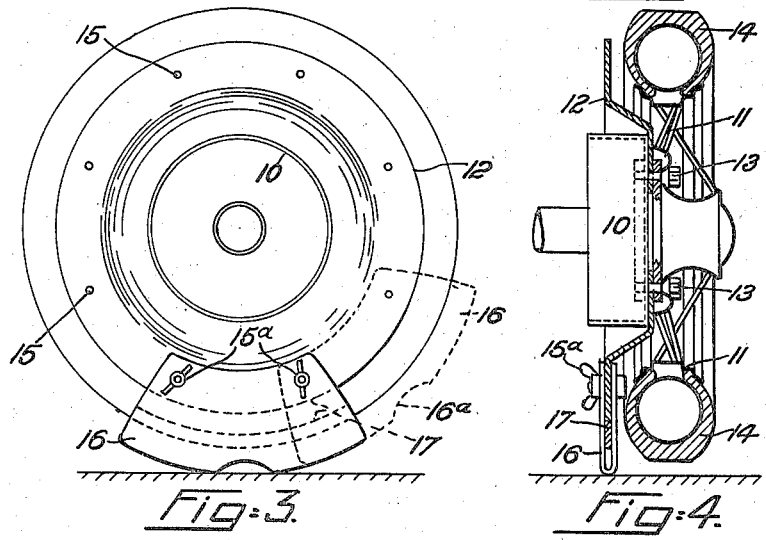
INVENTOR.
Eugene Dudley O'Donnell
By Geo.␣␣␣␣␣␣
ATTORNEY.

Patented Jan. 31, 1939

2,145,571

UNITED STATES PATENT OFFICE 2,145,571

COMBINED MEANS FOR JACKING MOTOR VEHICLES

Eugene Dudley O'Donnell, Kings Cross, Sydney, Australia

Application February 28, 1936, Serial No. 66,192
In Australia May 4, 1935

2 Claims. (Cl. 254—94)

This invention has been devised for use on motor vehicles its objects being (1) to jack a vehicle by the aid of its own power, in a manner that permits the removal of any one or more of the wheels, (2) to protect a pneumatic tire in case of puncture or blow-out.

In practically all if not all makes of modern motor vehicles the construction includes four wheel brakes and in such cases the invention consists of a supplementary wheel or disc rigidly secured to or integral with the brake drum, the diameter of such supplementary wheel or disc being greater than that of the rim of the wheel but less than that of the pneumatic tire when in position upon the rim and inflated to ordinary pressure, so that should the tire become deflated through a puncture or blow-out the disc will take the weight ordinarily imposed upon the wheel before complete deflation of the tire can take place and the vehicle can therefore continue to travel without injuring the deflated or partly deflated tire. It will be seen too that in such circumstances the supplementary wheel or disc functions as a jack so that the tire and wheel may be removed. In some instances it is desired that the distance between the axle and the ground level be increased and this is provided for by the formation of suitably shaped slots, preferably equidistant, around the periphery of the supplementary wheel or disc to form engaging means for stud pins rigidly secured to a suitably shaped plate with a convex cam like surface, hereinafter called a cam like lifting member, the function of which is similar to that of a cam When jacking a car according to this invention the cam like lifting member will be positioned on the supplementary wheel or disc whilst the vehicle is stationary and when secured the vehicle will be driven slowly so as to move the wheels through an arc, but in order to indicate to the driver when the cam like lifting member is centrally below the axle the cam like lifting member has a central concavity on its face in order that as the plate rolls into position it causes a slight bump sufficient to give the necessary indication to the driver.

In order that the invention may be fully understood a detailed description will now be given and reference made therein to the accompanying drawing in which:—

Figure 1 is an elevation viewed in the direction indicated by the arrow in Figure 2 and showing a supplementary wheel or disc rigidly secured to a brake drum on a motor vehicle, it being assumed that the pneumatic tire has been punctured and partly deflated thereby allowing the supplementary wheel or disc to function as a supplementary wheel.

Figure 2 is a central sectional elevation of Figure 1.

Figure 3 is a similar view to Figure 1 but in this instance it is assumed that it is desired to remove the wheel with the inflated tire thereon and the cam like lifting member is shown attached to the supplementary wheel or disc and moved to the jacked position, the dotted lines indicating one of the positions occupied by the cam like lifting member as it is being moved into the position shown by full lines.

Figure 4 is a central sectional elevation of Figure 3.

In all cases where the wheel is to be removed the supplementary wheel or disc must be used and although it will in some cases be possible to remove the wheel by using the supplementary wheel or disc alone it will in most cases be more convenient and in many cases absolutely necessary to use the cam like fitting member in addition to the supplementary wheel or disc.

Referring first to Figures 1, 2, 3 and 4, the brake drum 10 and wheel 11 are fixed in the usual manner. The supplementary wheel or disc 12 is a feature of this invention and when applied to existing vehicles of modern construction it will be centrally dished either by stamping or casting. The brake drum 10 will lie concentrically within the dished portion and the supplementary wheel or disc be rigidly secured thereto either by countersunk screws but preferably by means of the bolt and nut assemblies 13 by which the wheel 11 is usually secured to the brake drum. It is important to note that the diameter of the supplementary wheel or disc must be greater than the outside diameter of the rim of the wheel but less than the outer diameter of the tread of the pneumatic tire 14 when the latter is inflated.

In new constructions it will in all probability be preferred to combine the brake drum and supplementary wheel or disc in one piece. In certain vehicles of early construction the supplementary wheel or disc may be rotatably mounted upon the stub axle or stub axle flange, and if so this may be done without departing from the spirit of this invention.

In each case the means by which the supplementary wheel or disc is attached to the brake drum or stub axle must be such, that when the axle is jacked and the supplementary wheel or disc is supporting the weight of the axle, the wheel may be removed without also removing the supplementary wheel or disc.

The supplementary wheel or disc 12 will be provided with means such as the equally spaced holes 15 to enable the cam like fitting member 16 to be secured thereto by bolts and thumb nuts 15a or the like, the bolts being passed through any adjacent pair of holes 15 and similarly spaced holes in the cam like lifting member 16.

The cam like lifting member 16 may be made in various ways but according to the construction illustrated it is made in one piece folded over upon itself to U shape, a thickness piece 17 being riveted or welded between the folds to form a stop to limit the radial distance it may slide onto the supplementary wheel or disc when being placed in position thereon. When in position it will be securely fastened by the thumb nuts and bolts 15a. The U shaped plate is preferred because it forms a broader tread than that formed by a single plate and if it is considered necessary the periphery of the supplementary wheel or disc may be shaped to receive a solid rubber tire in which case a single plate cam like lifting member having an equalizing thickness piece to maintain the cam like lifting member in parallel alignment with the supplementary wheel or disc would be used.

When the cam like lifting member has been placed in position upon the supplementary wheel or disc 12 shown at Figures 1, 2, 3 and 4 the wheel will have to be rotated in order to bring it to a position shown by full lines at Figure 3. This will usually be done by using the engine but the driver woud not know when to stop the vehicle. In order to provide a means giving the necessary indication to the driver a deep concavity 16a will be formed centrally in the peripheral edge of the cam like lifting member 16 so that as the latter rotates with the supplementary wheel or disc the unevenness of the tread of the cam like lifting member will cause a bump when the vehicle, which will be driven very slowly, will be instantly stopped. Other means could be adopted but these would be more expensive and it is doutful whether they would be as efficient as the means described.

Attention is particularly directed to the fact that the use of the word "disc" in this specification is not intended to limit the scope of this invention to merely a circular plate. It is intended to include a circular form of any description having the necessary strength and moreover that form need not necessarily be limited to a single part. For example the circular form may comprise spokes and the periphery of such form may be provided with a broad tread or with a solid or pneumatic tire. Neither is it intended to confine the shape of the cam like lifting member 16 to the particular shape illustrated in the drawing, at Figure 3. It could be made in many shapes which would be equally effective and by forming a recess at one or both ends thereof, or in that portion or portions of the periphery of the cam like lifting member that form approaches to the tread proper, in all other shapes where the edges that form such approaches to the tread proper are formed at an opposite angle to that shown in the drawing, a cam like lifting member of any of such other shapes would perform all the functions the cam like lifting member 16 is intended to perform as hereinbefore described.

I claim:

1. An auxiliary wheel and jack assembly comprising, in combination with a vehicle axle having at its end a central rotary unit detachably carrying an outwardly removable primary wheel equipped with a pneumatic tire, an auxiliary wheel comprising a disc-like member secured independently to said rotary unit in such manner that the detachable primary wheel may be removed without removing the auxiliary wheel; said auxiliary wheel member being of greater diameter than the primary wheel but of materially less diameter than the tire tread and designed to receive at various positions along its rim portion a cam-like jack; and a cam-like jacking element, of a length very much less than the auxiliary wheel circumference, designed for ready attachment in any one of said various positions to said auxiliary wheel rim portion to rotate therewith and to extend the latter radially outwardly beyond the tire tread.

2. In combination with a vehicle axle having at its end a rotary unit carrying a supporting wheel equipped with a pneumatic tire, jacking means comprising a disc-like member secured to said rotary unit adjacent but inwardly towards the center of the axle from said supporting wheel, said member having a flat radial flange the periphery of which is of less diameter than the tire tread, and a readily attachable jacking device comprising a cam-like element of much less length than the flange periphery and U-shaped in cross section to afford a channel for slidably but rather snugly receiving said flat flange, and means for holding said element in a radial position on said flange where it will extend outwardly beyond the tire periphery.

EUGENE DUDLEY O'DONNELL.